United States Patent
Levine et al.

(10) Patent No.: US 7,588,219 B2
(45) Date of Patent: Sep. 15, 2009

(54) ADJUSTABLE ROLLER LEG

(75) Inventors: Steven Levine, 333 Mamaroneck Ave., #235, White Plains, NY (US) 10605; George T. Brown, Weatherly, PA (US)

(73) Assignee: Steven Levine, Scarsdale, NY (US)

( * ) Notice: Subject to any disclaimer, the term of this patent is extended or adjusted under 35 U.S.C. 154(b) by 144 days.

(21) Appl. No.: 11/303,741

(22) Filed: Dec. 16, 2005

(65) Prior Publication Data

US 2006/0186288 A1 Aug. 24, 2006

Related U.S. Application Data

(60) Provisional application No. 60/636,826, filed on Dec. 16, 2004.

(51) Int. Cl.
*F16M 11/24* (2006.01)
(52) U.S. Cl. ............. 248/188.4; 248/188.7; 108/144.11
(58) Field of Classification Search ............... 248/188.2, 248/188.4, 188.7, 188.8, 161, 188.1; 16/26, 16/22; 108/144.11, 147.22
See application file for complete search history.

(56) References Cited

U.S. PATENT DOCUMENTS

| | | | | |
|---|---|---|---|---|
| 1,016,324 A | * | 2/1912 | Dunn | 16/32 |
| 1,482,743 A | * | 2/1924 | Grover | 248/188.7 |
| 2,403,338 A | * | 7/1946 | Butler | 248/188.4 |
| 3,455,526 A | * | 7/1969 | Orii | 248/188.4 |
| 4,108,455 A | * | 8/1978 | James | 16/26 |
| 6,854,160 B2 | * | 2/2005 | Polevoy et al. | 16/26 |

* cited by examiner

*Primary Examiner*—Amy J. Sterling
*Assistant Examiner*—Tan Le
(74) *Attorney, Agent, or Firm*—Thomas A. O'Rourke; Bodner & O'Rourke, LLP

(57) ABSTRACT

An adjustable roller apparatus has a housing and a roller ball, rotatably mounted in the housing. There is also a base adjuster that is adapted to be moved from a first position to a second position and where one of the first and second positions of the base adjuster is a retracted position that permits the roller ball to contact a surface and rotate on the surface and the other position of the base adjuster is an extended position whereby the base adjuster contacts the surface.

8 Claims, 7 Drawing Sheets

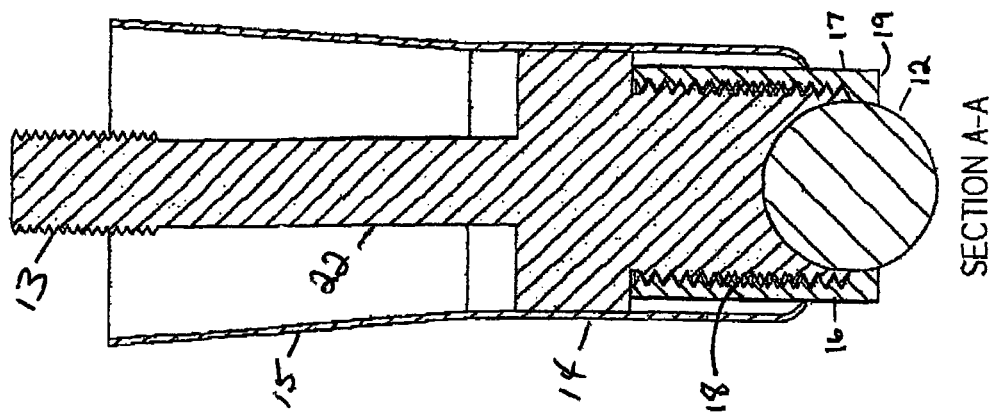
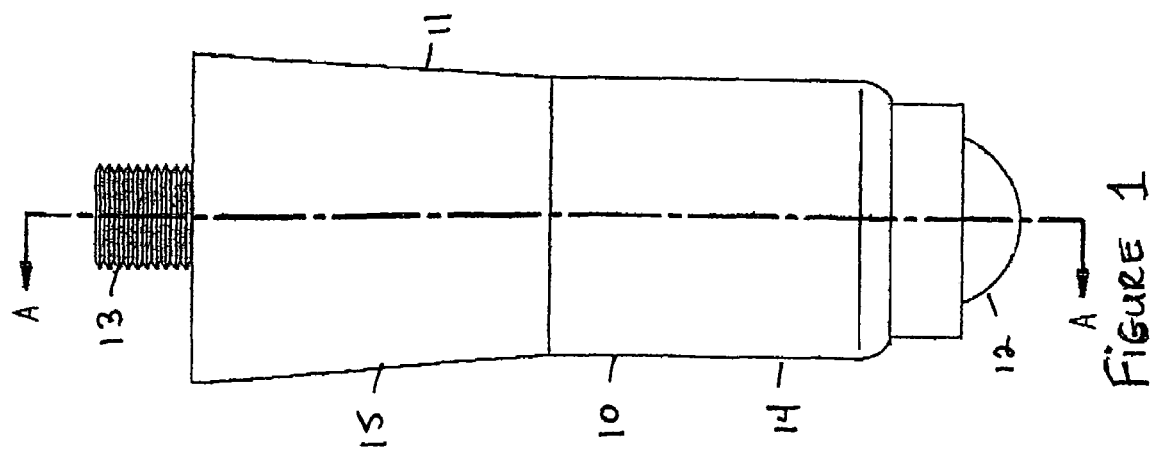

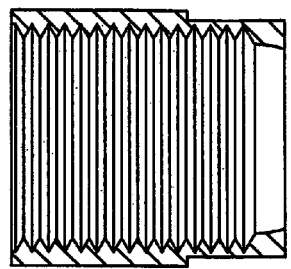
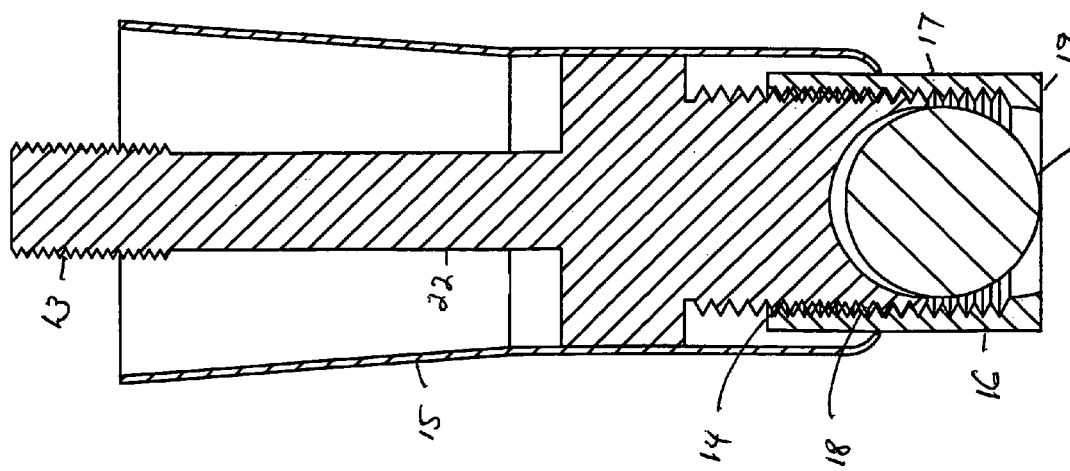

ADJUSTABLE ROLLER LEG

The present invention claims priority on U.S. Provisional Patent Application Ser. No. 60/636,826 filed Dec. 16, 2004, the disclosures of which are incorporated herein by reference.

FIELD OF THE INVENTION

The present invention relates to improvements in hardware and more particularly hardware that permits table legs and other legs to be more mobile and movable in a variety of conditions. The hardware of the present invention also permits a leg or a base to which the device is attached to be height adjusted to suit a variety of conditions.

BACKGROUND OF THE INVENTION

There are many appliances and articles of furniture that have legs. Other articles have wheels or casters attached to a bottom surface. These include tables, chairs, breakfronts, etc. Appliances having legs can be stoves, sinks, ovens, etc. Other articles include medical equipment, machinery, barbecues, etc. These legs or bases provide support for the device. Many of these articles, however, are used in applications and in situations where they have to be moved from time to time. Also in many instances, the floor is not level and smooth. For example, in a kitchen or other location an article such as a stove, refrigerator, table, etc. may need to be relocated or moved for cleaning. Many types of tables, refrigerators, stoves, medical equipment, tools, etc. are bulky and heavy. It is not uncommon for these devices to have to be moved. Stoves and refrigerators and other mechanical devices may need to undergo repairs and access to the rear of the device may be necessary. In other instances, many devices may need to be moved to a new location or moved away from their original location for cleaning behind them or underneath them or moved for other reasons. Also, a stove or table in an older home may wobble because the home has not settled uniformly over the years. In commercial establishments, a similar situation can occur. For example, the floor may be rough or worn in areas that cause the floor to not be level. Besides the aesthetics and comfort of a table or other article that wobbles, there can also be a safety issue. An unstable table can spill hot food products over workers and diners. Even outside of the kitchen, there are many applications such as in offices, laboratories and elsewhere where there is a need for a stable work surface.

Besides worn surfaces, there are also many flooring materials that are popular today that are also not smooth. One example is ceramic floor tile. Many homeowners and restaurants desire the rustic look provided by some floor tiles such as a tumbled marble or ceramic. This flooring material can have surfaces that are not smooth and level. In addition, there are frequently wide gaps between these tiles that can cause tables and appliances to not be level when resting thereon.

The traditional solution for solving the problem of wobbly legs has been to place a thin flat material or wedge under the offending leg to prevent movement. Alternatively, there have been adjustable legs that have an orifice in the center bottom tip of the leg. The orifice is threaded and receives a threaded member with a base or pad attached thereto. As the base is turned, the threaded member extends or retracts to level the leg. While these approaches eliminate the wobbling of a table or other article, these approaches are not satisfactory when the table leg has a roller on the bottom surface. A shim or wedge under the roller is usually not satisfactory because the roller would have a tendency of rolling off the shim.

There are a number of different approaches to solving the problem of unsteady tables and other devices. For example, in U.S. Pat. No. 6,644,216 to Cole, there is an adjustable leg that is pivotally attached to a table top. The leg has an adjuster that can vary the angle of the leg to steady a table. In U.S. Pat. No. 6,598,841 to Erickson, there is a height adjustable table leg that is attachable to the underside of a table. There are a pair of tube members and one tube member telescopes into the other tube member. An adjustable leg assembly is also disclosed in U.S. Pat. No. 6,595,144 to Doyle. Doyle has a mounting system in which an outer support or base leg receives a pair of spaced multiple section slides, each having one end coupled within the base leg and the opposite end coupled to a motor activator secured to the underside of a work surface. The slides provide lateral strength and stability for the telescopic motion between raised, lowered and intermediate adjustable positions and provide a trim cover for concealing the drive mechanism employed for adjusting the work surface.

An adjustable leg is also disclosed in U.S. Pat. No. 6,032,914 to Bastida. In Bastida, there is an adjustable leg for benches, stilts and the like. The leg has a first elongate strut that has a first strut end wall defining an outer surface. The first strut wall has a first aperture therein. A second elongate strut having a second strut end wall is telescopically received in the first strut. The first strut end wall and the second strut wall have a plurality of apertures therein. A lever is journalled for rotational movement which causes the leg to adjust in height using the apertures. There is a need for an adjustable leg that can glide over a floor because of the presence of a roller or other suitable rotating member.

OBJECTS OF THE INVENTION

It is an object of the invention to provide an improved adjustable leg.

It is an object of the invention to provide an adjustable leg that has a roller base.

It is an object of the invention to provide an adjustable roller arrangement for a leg or base.

It is an object of the invention to provide an adjustable roller arrangement that can readily be activated to a movable condition and deactivated to a stationary condition.

It is also an object of the invention to provide a roller that can be extended to permit an article to be readily moved and retracted to prevent easy movement.

It is also an object of the invention to provide an improved mechanism for adjusting the height of a table, chair or other article.

It is another object of the invention to provide a device that can adjust the height of a leg to expose or conceal a roller ball used on a chair, table or other leg or other means for support.

SUMMARY OF THE INVENTION

The present invention is directed to an improved adjustable leg that has a roller surface that may be in an extended position when an article is to be moved and in a concealed position when the article is to be stationary. The article of the invention has a housing with a base adjuster and a roller ball. By the term roller ball includes but is not limited to a ball or a wheel that rotates. When the base adjuster is in a retracted position, the roller ball or wheel is exposed and can rotate. When the base adjuster is in an extended position, the roller ball does not contact a floor or other surface and will prevent the roller ball from rotating. In one embodiment, the roller ball will be positioned in a recess in an inner stem assembly. The inner stem assembly provides an outer threaded surface that mates with the inner threaded surface of the base adjuster and permits the base adjuster to be moved from a retracted to an extended position and vice versa. One end of the inner stem assembly may be threaded and permit the article of the present invention to be secured to a table or other leg or surface.

BRIEF DESCRIPTION OF THE DRAWINGS

FIG. 1 is a side view of a representative leg of the present invention.

FIG. 2 is a cutaway view of the leg of FIG. 1 taken along A-A.

FIG. 12 is a cutaway view of the base adjuster of FIG. 11 taken along D-D.

FIG. 16 is similar to FIG. 4 except that the ball is freely movable when the base adjuster is extended.

DETAILED DESCRIPTION OF THE INVENTION

FIG. 1 shows a representative adjustable leg assembly 10 of the present invention. There is a housing 11 that may be any shape desired, but is usually configured so that it matches the style or shape of the article that has the adjustable leg. There is a roller ball or wheel 12 that may be in an extended position or a concealed position as necessary. When the roller ball is extended or exposed, the ball can readily rotate permitting the leg which is attached to an article to move in virtually any direction. When the ball is recessed, the leg is not usually easily moved. The roller ball may be made of any suitable material including but not limited to metal, plastic, etc. and is preferably freely rotatable in the assembly. If made of plastic, the ball should be able to withstand the weight of its share of the table or other article and any items placed thereon. In one embodiment, the ball can be a stainless steel ball. In another embodiment, the ball can be a thermoplastic or thermosetting material. In still another embodiment, the ball can be a plastic ball with a metal coating over, for example, a nylon or glass filled nylon ball. The metal coating can be a chrome or stainless steel coating. The ball can be made of other materials, including but no limited to rubber, brass, glass, aluminum or other suitable material. A threaded extension 13 can be used to secure the assembly to the bottom of a table leg or other leg. In an alternative embodiment, the extension could be a threaded recess in the surface and the table leg has a threaded extension. In a still another embodiment, the article of the present invention may be rotatably mounted to a plate that may be secured to an article such as a base or other surface. The plate arrangement is like the plate to which a traditional caster is secured. The plate would have a surface with a plurality of orifices for securing the plate to a base. The article of the present invention may extend from the plate. In a still further embodiment, the extension can be on either the leg or the assembly and any suitable securing means can be used.

Figure 7:
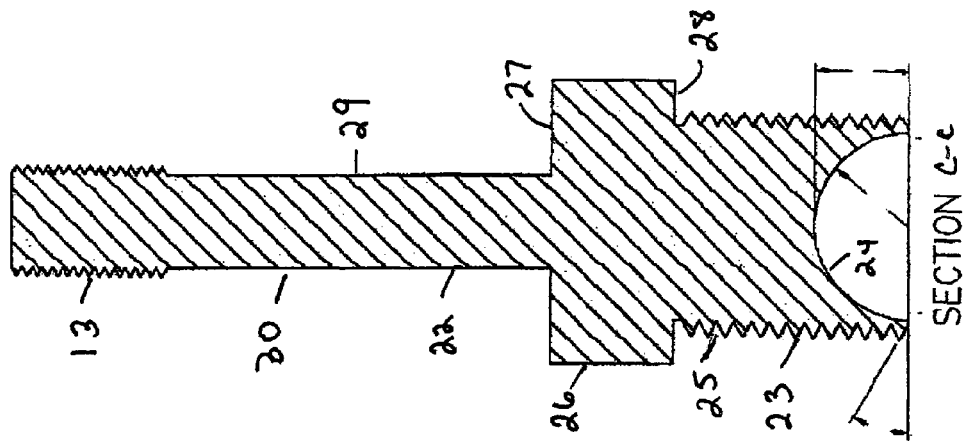
FIG. 7 is a cutaway view of the inner stem assembly taken along C-C.
Figure 6:
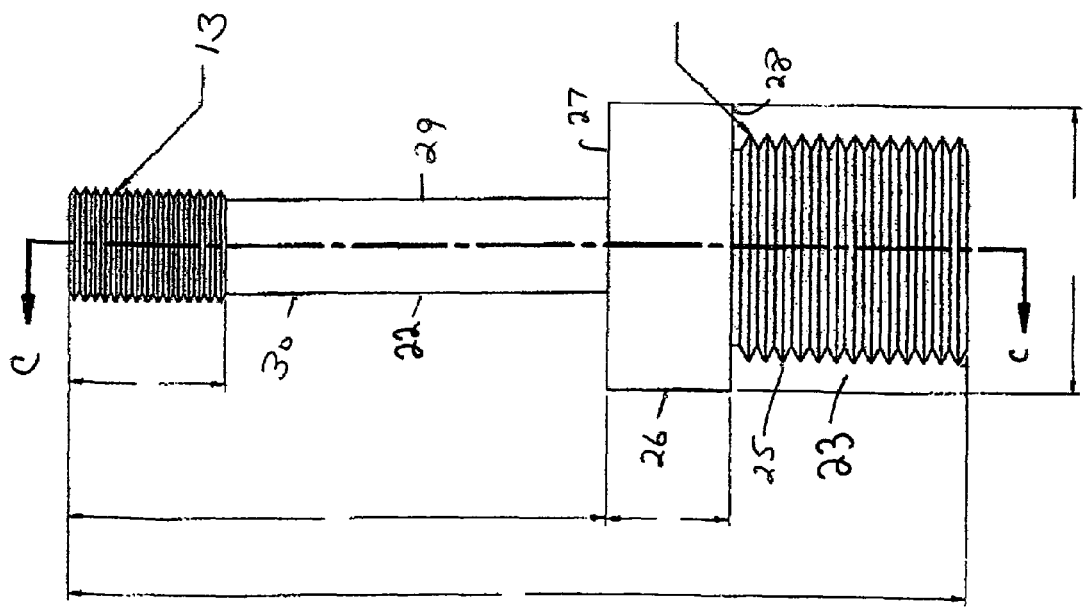
FIG. 6 is a side view of the inner stem assembly.

The inner stem assembly 22 seen in FIGS. 6 and 7 is preferably a separate member from the housing 11. In one embodiment, the threaded member 13 can be part of the upper surface of the housing and not separate therefrom. In this embodiment, the upper portion of the housing and the threaded member can be integral and preferably made of the same material.

The housing 11 has been shown with two sections, a generally cylindrical base section 14 and a conical upper section 15. The shapes are provided as examples only and it will be appreciated by those skilled in the art that the shape and configuration of the housing can vary as needed. For example, the housing can be square or rectangular in cross section, it can have parallel sides, etc. Alternatively, the leg may have decorative touches such as a Sheraton or Hepplewhite design, a ball and claw, and others. In the figures, the housing is shown in two members, this is for convenience. The housing can be a single member or there can be additional members. In a preferred embodiment, the housing can be a member having a length and a width with an orifice at each end. The orifice can be throughout the length of the housing or if desired, can just be at the ends. When the orifice goes through the housing in a preferred embodiment, the housing can receive an inner stem.

Figure 3:
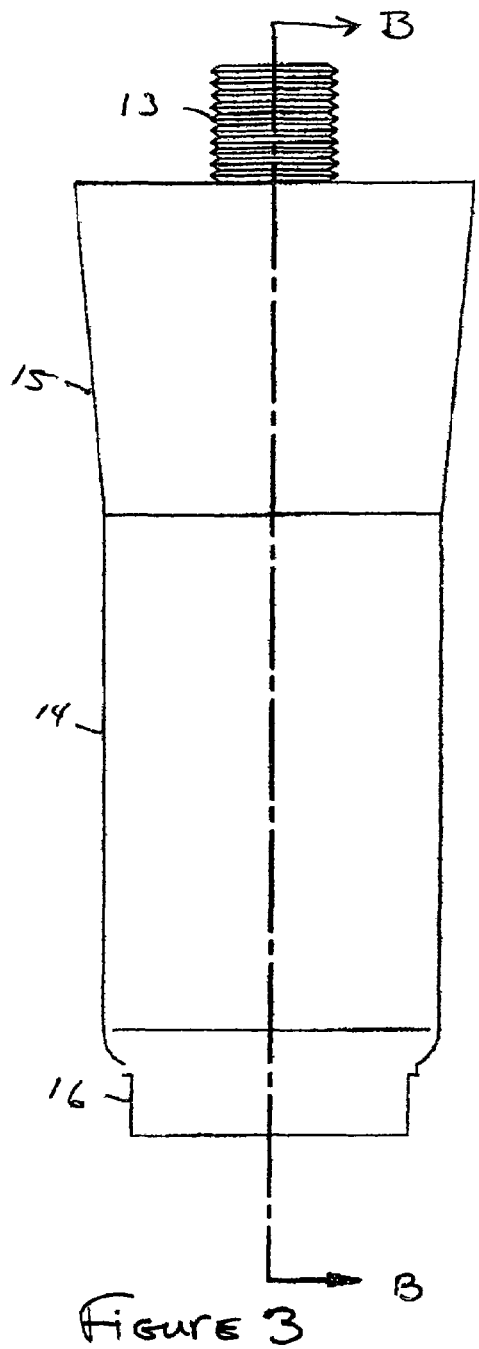
FIG. 3 is a side view of the leg of FIG. 1 with the roller ball concealed in the leg.
Figure 4:
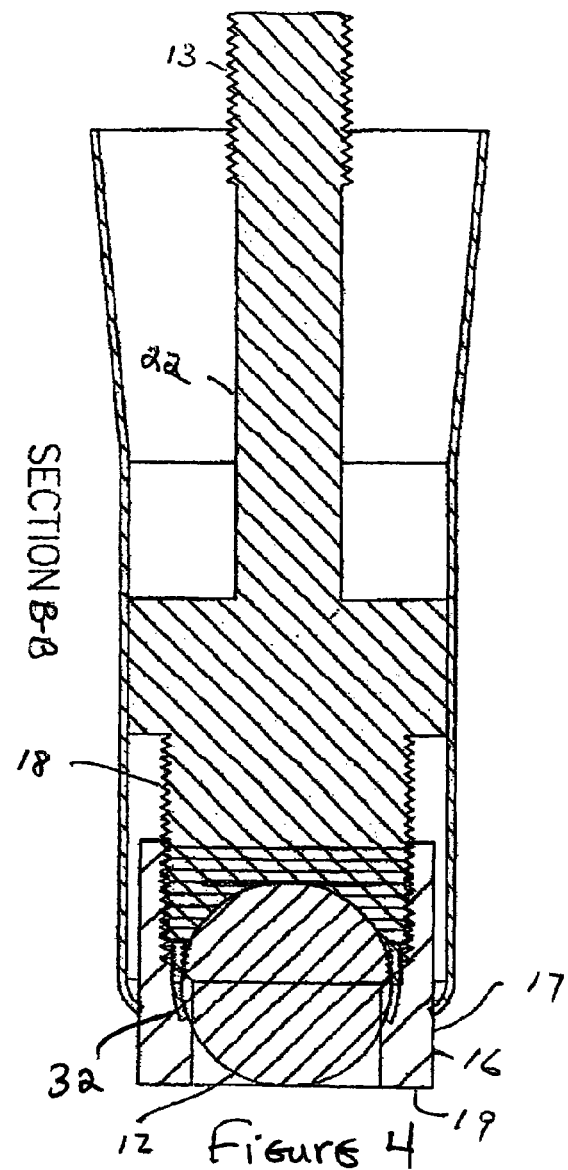
FIG. 4 is a cutaway view of the leg of FIG. 3 taken along B-B.
Figure 5:
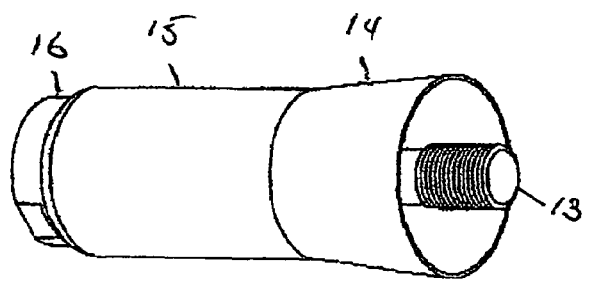
FIG. 5 is a perspective view of the leg of FIG. 3.
Figure 15:
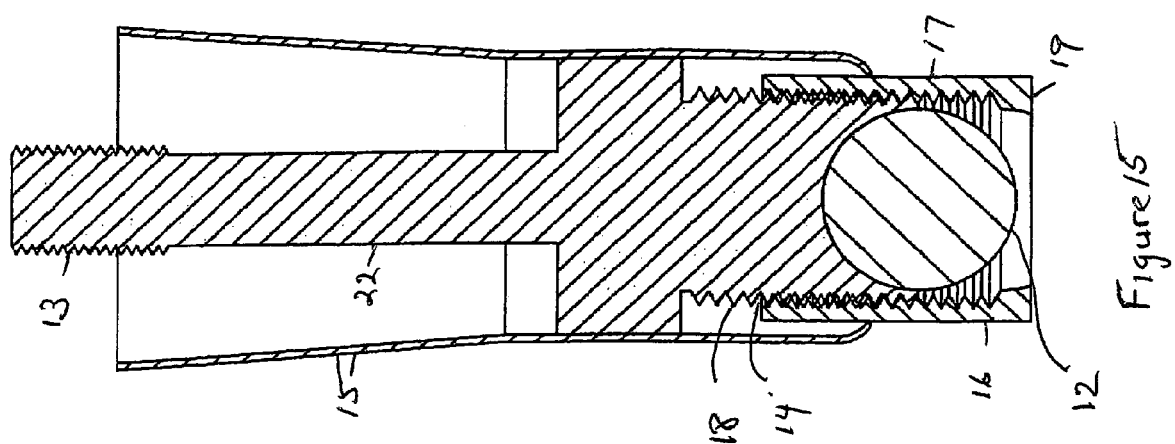
FIG. 15 is similar to FIG. 4 except that there is no gasket.

As seen in FIG. 2, there is a roller ball 12 that is retained in position on the inner stem assembly 22 by a base adjuster 16. The roller ball 12 can be made of metal or plastic and preferably rotates in the assembly. The base adjustor 16 is a cylindrical ring having an outer sidewall 17 and an inner sidewall 18. The outer sidewall is shaped to fit into the base section 14 of the housing by a suitable means. Preferably a portion of the base adjuster 16 extends below the housing as shown in FIG. 2. This permits ease of assembly and enhances the adjustability since appropriate tools such as wrenches can be used to adjust the amount that the base adjuster extends from the housing. The inner sidewall 18 of the base adjuster is preferably threaded and mates with the outer threaded sidewall 25 of the inner stem assembly 22. The lower surface 19 of the base adjuster extends around the perimeter of the base adjuster forming an orifice 20 for the ball to extend from. The orifice has a diameter slightly less than the diameter of the roller ball. The orifice 20 of the base adjuster has a side edge 21 that is preferably provided with a curved surface that mates with the curved surface of the roller ball and permits the roller ball to rotate freely in the assembly and retains the ball in the assembly. Alternatively, there may be a gasket or grommet 32 between the roller ball 12 and the side edge 21 of the base adjuster 16 to keep the ball in place. The gasket or grommet may also be positioned generally in the region between the base 23 or lower surface 19 and the recess 24 or in other suitable location. Preferably the gasket is made of a material that has a low coefficient of friction and does not bind the roller ball when the base adjuster is retracted. FIG. 15 shows the assembly of FIG. 4 without the gasket or grommet.

The roller ball resides in a recess 24 in the inner stem assembly 22. In one embodiment, the inner stem assembly has a base 23 with a recess 24 generally in the shape of the roller ball so that the roller ball can be received in the base of the stem assembly. This shape permits the roller ball to rotate. The inner stem assembly 22 further has an outer threaded side wall 25 that receives the inner threaded side wall of the base adjuster 16. As the base adjuster is turned or rotated, the thread causes the base adjuster to extend or retract. As the base adjuster extends, the bottom surface of the roller ball does not extend past the base adjuster (See FIG. 4) and as a result the table cannot roll through the motion of the roller ball. When the leg or base needs to be moved, the base adjuster can be turned so that the base adjuster retracts inwardly into the assembly, thus exposing the roller ball (See FIG. 2). When the roller ball is exposed, the ball can rotate. FIG. 16 shows an alternate embodiment of the present invention where the ball 12 is more loosely contained in the apparatus and there may be a gap between the ball 12 and the recess 24.

As shown in FIG. 2, the base of the inner stem assembly 22 preferably has at least two portions. There is a threaded portion 25 and a main body 26. The threaded portion 25 has a recess portion for receiving the roller ball. The outer wall 25 of the recess portion is threaded so that it receives the threaded base adjuster removably connected to the base adjuster. The main body 26 of the stem assembly has a top surface 27 and a bottom surface 28. The top surface has a stem 29 extending therefrom. The stem 29 has a first section 30 and a second end 13 which is threaded. It will be appreciated that the main body 26 can vary in thickness and the length of the stem 29 can also vary. It will also be appreciated that the stem can be in two separate and distinct members. The stem 29 and the threaded portion 25 two members need not contact each other. The first member is the portion having the threaded side wall 25 that mates with the threaded side wall 18 of the base adjuster. The second member is the stem 29 having a threaded end 13. As long as the threaded end 13 is secured to the housing, there is no need for it to be connected to the threaded portion 25. It will be appreciated that other securing arrangements are possible. For example, there may be a friction fit, a bayonet type fit or other suitable connection means to a leg.

Figure 8:
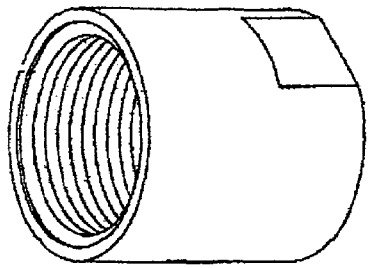
FIG. 8 is a perspective view of an example of the the base adjuster with two flat sections on opposite sides of the base adjuster for a wrench or other device to turn the base adjuster.
Figure 10:
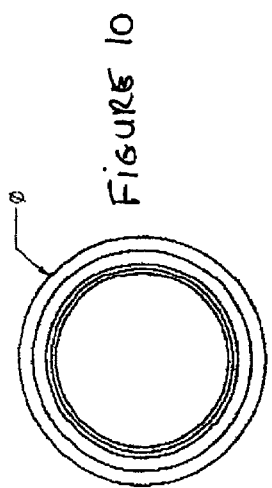
FIG. 10 is an end view of the top of the base adjuster of FIG. 8 and FIG. 9.
Figure 11:
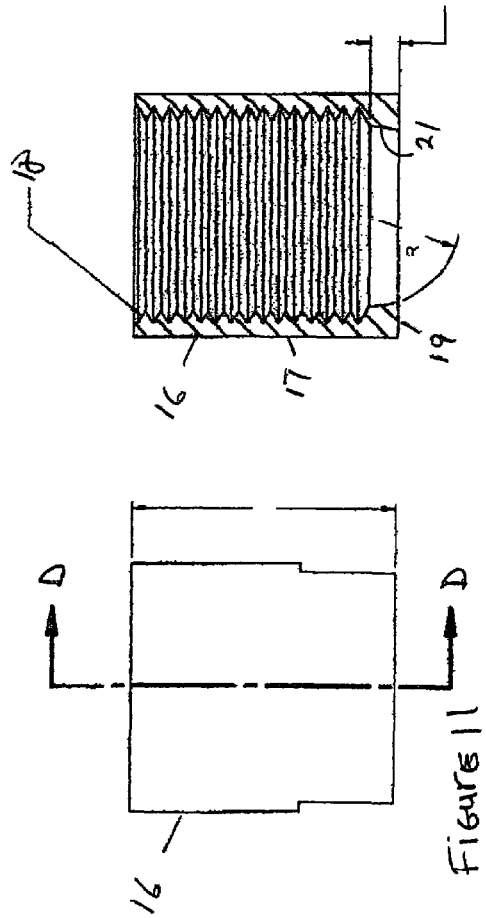
FIG. 11 is a side view of the base adjuster of FIG. 8.
Figure 12A:
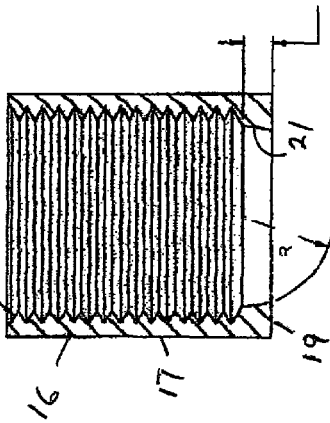
FIG. 12A is a cutaway view of the base adjuster of FIG. 8 take along a section of the base adjuster that does not have the flat sections present
Figure 9:
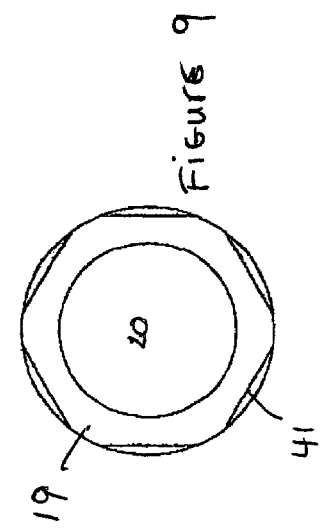
FIG. 9 is an end view of the bottom of a base adjuster similar to the base adjuster shown in FIG. 8 except it has six flat sections on the base adjuster for a wrench or other device to turn the base adjuster.
Figure 14:
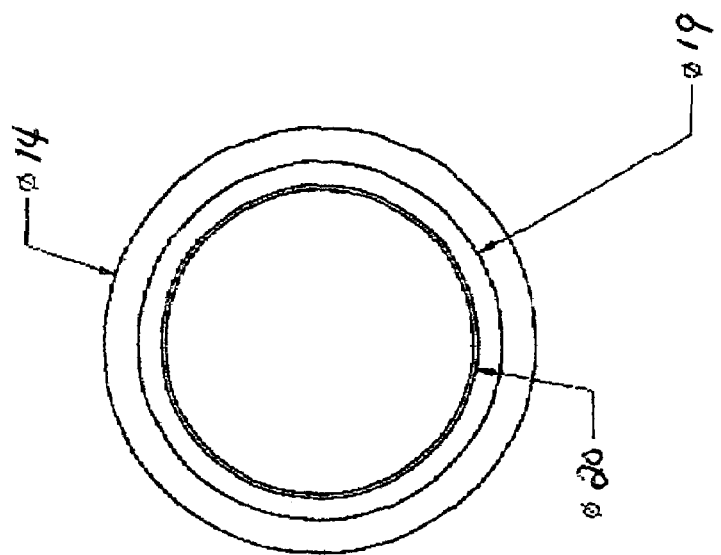
FIG. 14 is an end view of the housing of FIG. 13.
Figure 13:
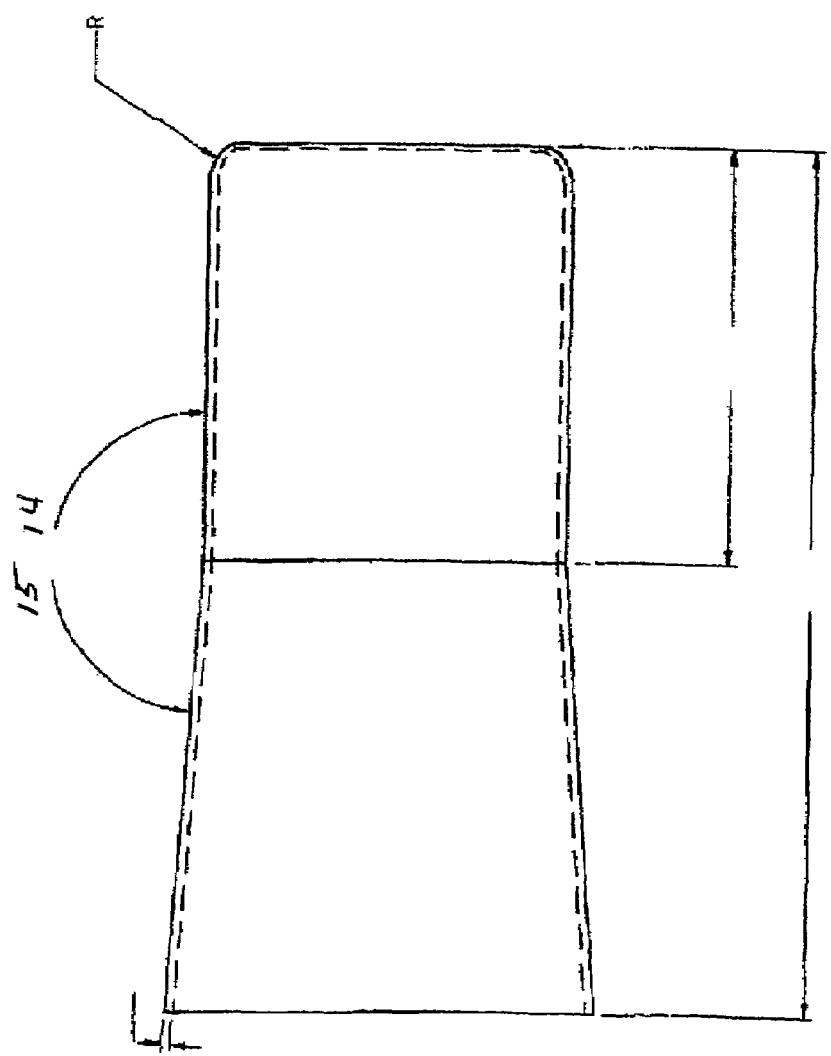
FIG. 13 is a side view of a representative housing.

The base adjuster 16 is shown in more detail in FIGS. 8-12. FIG. 9 shows one embodiment where the bottom surface 19 has a plurality of straight edges 41 for a wrench to be used to turn the base adjuster. FIG. 8 shows an alternative arrangement for the surface where there are two flat sections on opposite sides of the base adjuster. FIG. 12 is a cutaway view of the base adjuster of FIG. 11 taken along D-D. FIG. 12A is a cutaway view of the base adjuster of FIG. 8 take along a section of the base adjuster that does not have the flat sections present.

We claim:

1. An adjustable roller apparatus comprising a housing, a stem assembly, a roller ball, and a base adjuster, said housing having a first end and a second end, said first end having an opening for receiving said base adjuster, said roller ball being rotatably mounted in said base adjuster, said stem assembly having a first end that is securable to an article and a second end that is threadable on an outer surface thereof and securable to said base adjuster, said second end of said stem assembly having a recessed portion for receiving said roller ball, said base adjuster having an inner surface and an outer surface, at least a portion of said outer surface residing in said housing and contacting an end thereof, said inner surface of said base adjuster being threadably secured to said stem, said base adjuster being adapted to be moved from a first position to a second position and where one of said first and second positions of said base adjuster is a retracted position that permits said roller ball to contact a surface and rotate on said surface and said other position of said base adjuster is an extended position whereby said base adjuster contacts said surface.

2. The adjustable roller assembly according to claim 1 further comprising an inner stem assembly, said inner stem assembly having a recess for receiving said roller ball.

3. The adjustable roller assembly according to claim 2 wherein said inner stem assembly has a threaded outer wall and said base adjuster has an inner threaded wall.

4. The adjustable roller assembly according to claim 3 wherein said inner stem assembly has a threaded portion that extends from said housing and permits the assembly to be secured to a base.

5. The adjustable roller assembly according to claim 3 wherein said inner stem assembly has a threaded portion that extends from said housing and permits the assembly to be secured to a leg.

6. The adjustable roller assembly according to claim 3 wherein there is a gasket between said roller ball and said base adjuster.

7. The adjustable roller assembly according to claim 3 wherein said stem assembly is a single member.

8. The adjustable roller assembly according to claim 3 wherein said stem assembly is threadably secured to said article.

* * * * *